US012661297B2

(12) United States Patent
Mukhin

(10) Patent No.: US 12,661,297 B2
(45) Date of Patent: Jun. 23, 2026

(54) APPARATUS FOR LIMB REHABILITATION AND METHOD OF USING SAME

(71) Applicant: Vibraint Inc, Richmond Hill (CA)

(72) Inventor: Oleg Aleksandrovich Mukhin, Samara (RU)

(73) Assignee: VIBRAINT INC, Richmond Hill (CA)

( * ) Notice: Subject to any disclaimer, the term of this patent is extended or adjusted under 35 U.S.C. 154(b) by 470 days.

(21) Appl. No.: 18/281,692

(22) PCT Filed: Mar. 17, 2022

(86) PCT No.: PCT/RU2022/050088

§ 371 (c)(1),
(2) Date: Sep. 12, 2023

(87) PCT Pub. No.: WO2022/197216

PCT Pub. Date: Sep. 22, 2022

(65) Prior Publication Data

US 2024/0148593 A1 May 9, 2024

(30) Foreign Application Priority Data

Mar. 17, 2021 (RU) ................................ 2021107046

(51) Int. Cl.
*A61H 1/02* (2006.01)

(52) U.S. Cl.
CPC ..... *A61H 1/0274* (2013.01); *A61H 2201/501* (2013.01); *A61H 2201/5064* (2013.01)

(58) Field of Classification Search
CPC ............ A61H 1/0274; A61H 2201/501; A61H 2201/5064
See application file for complete search history.

(56) References Cited

U.S. PATENT DOCUMENTS 5,179,939 A * 1/1993 Donovan ............. A61H 1/0281 482/4
5,830,160 A * 11/1998 Reinkensmeyer ..... A61B 5/224 600/595

(Continued)

FOREIGN PATENT DOCUMENTS

CA 2678425 A1 8/2008
CN 103006414 A * 4/2013

(Continued)

OTHER PUBLICATIONS

Translation CN 103006414.*

*Primary Examiner* — Shaun R Hurley
(74) *Attorney, Agent, or Firm* — MUNCY, GEISSLER, OLDS & LOWE, P.C.

(57) ABSTRACT

A robotic device for limb rehabilitation includes a base with supports, an adjustable stand, a guiding rail, and a carriage carrying a limb holding assembly having cradles for a middle limb segment and an extreme limb segment. The carriage is driven along the guiding rail, and the limb holding assembly is configured to move the supported limb segments while maintaining natural anatomical motion. The device includes a control unit, sensors for determining positions of device elements, and an emergency stop system. The configuration allows movement of the limb in multiple planes, including translation of the middle limb segment along a longitudinal axis and angular movement of the extreme limb segment relative to the middle limb segment. The device is compact, mobile, and configurable for use in seated or supine positions to provide personalized rehabilitation.

23 Claims, 10 Drawing Sheets

(56) References Cited

U.S. PATENT DOCUMENTS

| | | | | |
|---|---|---|---|---|
| 6,676,570 | B2 | 1/2004 | Valentino | |
| 8,273,043 | B2 | 9/2012 | Bonutti et al. | |
| 8,968,220 | B2 * | 3/2015 | Han .................. | A63B 21/4039 601/5 |
| 9,603,768 | B1 | 3/2017 | Widmer et al. | |
| 9,744,092 | B2 * | 8/2017 | Fu ........................ | A61H 1/0281 |
| 9,974,999 | B2 | 5/2018 | Land | |
| 2003/0028130 | A1 | 2/2003 | Wunderly et al. | |
| 2006/0106326 | A1 | 5/2006 | Krebs et al. | |
| 2006/0211957 | A1 | 9/2006 | Beny et al. | |
| 2009/0281465 | A1 * | 11/2009 | Fu ........................ | A61H 1/0274 601/5 |
| 2011/0251533 | A1 | 10/2011 | Han et al. | |
| 2013/0237883 | A1 * | 9/2013 | Malosio ............... | A61H 1/0281 601/33 |
| 2016/0296405 | A1 | 10/2016 | Oshima et al. | |
| 2018/0264312 | A1 | 9/2018 | Pompile et al. | |

FOREIGN PATENT DOCUMENTS

| | | | |
|---|---|---|---|
| CN | 108113849 | A | 6/2018 |
| DE | 696 10 326 | T2 | 2/2001 |
| EP | 3 056 182 | A1 | 8/2016 |
| RU | 2427361 | C2 | 8/2011 |
| RU | 147759 | U1 | 11/2014 |
| RU | 2629738 | C1 | 8/2017 |
| RU | 175852 | U1 | 12/2017 |
| RU | 175854 | U1 | 12/2017 |
| RU | 2653811 | C1 | 5/2018 |
| RU | 2720323 | C1 | 4/2020 |
| TW | 201306819 | A | 2/2013 |
| WO | WO-2009/016478 | A2 | 2/2009 |

* cited by examiner

APPARATUS FOR LIMB REHABILITATION AND METHOD OF USING SAME

The device belongs to the field of medicine, namely to neurology and rehabilitation, and can be used as a robotic part of a system for motor rehabilitation training after a stroke and other diseases and injuries of the central nervous system and limbs. The objective of the claimed invention is to execute the movement of the affected limb when performing exercises aimed at motor rehabilitation of patients with diseases and injuries of the central nervous system and/or limbs, causing motor deficit. The invention can also be used in sport and home exercise equipment for various purposes. The technical result of the invention is a design of a robotic device for motor rehabilitation that meets the requirements of mobility, compactness, safety, able to provide rehabilitation training for patients in both lying or sitting position, in a hospital or at home, with a completely immobilized limb or with a limb with limited mobility, execute moving of the limb in several planes and similar to natural, provide individual settings for each patient, allowing the effective personalized training and thereby increasing the efficiency of motor rehabilitation.

DESCRIPTION OF THE INVENTION

Field of the Invention

The invention relates to medicine and is intended for use as part of a system for the rehabilitation of patients with limb paralysis, as well as a home or sports exercise equipment to increase motor control accuracy and muscle strength. The device is designed for kinesthetic impact on the limb being rehabilitated, including its movement and evoking proprioceptive sensations, and is characterized by high mobility, compactness, the possibility of individualized adjustment and the original kinematic scheme. The design also allows the use of an additional controlled exoskeleton to increase the number and complexity of the movements performed.

Flaccid paralysis (plegia, paresis) is common in many diseases, primarily strokes and injuries of the central nervous system and spinal cord. To restore the lost motor function, various methods are used, such as rhythmic magnetic stimulation, transcranial magnetic stimulation, various types of massages, physiotherapy exercises, including the use of exercise equipment. The use of such equipment, as a rule, implies that the limb being rehabilitated has at least minimal level of muscle activity. Thanks to the development of robotics, the designs of such systems have been improved, they have been supplemented with various sensors, for example, tenso- or myo-sensors, the use of which allows the patient to initiate the operation of the device with minimal physical effort produced by the limb being rehabilitated. Eventually, such systems have also became used for patients with severe and complete plegia of the limbs—in this case, the movement of the robotic device is initiated either according to some algorithm or under the influence of other factors, in particular, the initiating signal can be a signal from special software that analyzes the brain and/or muscular activity via electroencephalographic or electromyographic signals. Regardless of the technologies used, almost all rehabilitation devices imply use in a rehabilitation room. Accordingly, their design, if it contains special features for moving, only allows moving within one room, which greatly complicates rehabilitation at home for a low-mobility category of patients, which, due to the nature of the course of the disease in patients with stroke or spinal injury, includes most of them. In addition, the design of most robotic rehabilitation systems assumes that the patient must take a sitting position, which makes it impossible to carry out rehabilitation on these devices for bedridden patients.

DESCRIPTION OF THE BACKGROUND ART

There is a known exoskeleton of the upper limbs (see the description of the invention to the patent of the Russian Federation No. 2629738, IPC A61N 1/00, IPC A61N 1/02, publ. 31 Aug. 2017), containing at least one external frame for the limb, consisting of a shoulder element, shoulder and forearm modules, elbow joint and hand holder, equipped with a supporting-adaptive element for attaching to a vest or a wheelchair, to which at least one support is attached for attaching the outer frame.

In such a device, the object of the invention is to use springs to increase the range of motion of the upper limbs. It is solved in such a way that the patient, being initially in the sitting position, performs physical exercises along the axes of the joint using a short lever and an incomplete range of motion, then proceeds to perform physical exercises already along a long lever, increasing the range of motion.

The invention relates to medicine, namely to a device designed to increase residual muscle strength and expand the range of motion of the upper limbs, and can be used both for habilitation and rehabilitation of patients with flaccid paralysis (paraparesis) of the upper limbs, and as a sports simulator, as well as when carrying out work associated with the performance of actions associated with a long static stay of the upper limbs in a forced position, for example, when working as a surgeon, photographer or cameraman.

The disadvantages of this device are: the impossibility of use by people with severe plegia of the upper limbs, since to use the exoskeleton, the user must use their own muscle efforts; lack of automation in the implementation of mobility restoration processes; not applicable for the rehabilitation of bedridden patients.

There is a known device for restoring mobility of fingers (see the patent of the Russian Federation No. 147759, IPC A61F 2/54, A61F 2/72, publ., 20 Nov. 2014) The utility model is aimed at providing the ability to move each finger on the patient's mental commands. This result is achieved by the fact that the device for restoring the mobility of the fingers contains a hand exoskeleton, drives for moving the fingers of the exoskeleton with a control unit, while it is equipped with an individual drive for moving each of the fingers, equipped with a means of attracting the attention of the patient, and the input of the control unit for the drives of the fingers is connected with an electroencephalographic cap worn on the patient's head, while the control unit contains an electroencephalogram recording unit, an electroencephalogram analysis unit and a unit for generating commands for finger drives.

The disadvantage of this device is the impossibility of using it to restore the mobility of the entire arm, since during rehabilitation the patient uses only their fingers.

There is a known device for the rehabilitation of the hand (see the patent of the Russian Federation No. 175854, IPC A61H 1/02 publ. 21 Dec. 2017). The utility model relates to medicine, namely to physiotherapy, and can be used in restorative procedures for the muscle activity of a human hand.

Device for hand rehabilitation, including a platform with a supporting element, a base lever made spaced apart and connected to the platform, two movable levers connected to each other by a rotational pair, the first of which is equipped with a drive and connected to the base lever by a rotational pair with the possibility of installation coaxially with the axis of rotation of the proximal phalanges of the hand, the second one is kinematically connected to the base lever and is configured to be connected to the phalanges of the fingers, characterized in that the platform is configured to be installed through the supporting element on the forearm, the base lever is configured to be connected to the hand through the supporting element, and with the platform—through a rotational pair and equipped with a drive, the movable levers are made with the possibility of connection through the supporting elements, while the first lever—with the proximal phalanges of the fingers, and the second—with the middle phalanges of the fingers.

The disadvantage of this device is the impossibility of using the entire arm for rehabilitation, since the impact can only be exerted on the hand.

There is a known exoskeleton device for the rehabilitation of hands (see the patent of the Russian Federation No. 175852, IPC A61H 1/02 publ. 21 Dec. 2017). The utility model relates to medicine, namely to physiotherapy, and can be used in restorative procedures for the muscle activity of a human hand. The utility model is aimed at expanding the functionality in terms of training the flexion and extensor muscle groups of the arms with their different spatial orientation. The exoskeleton device for hand rehabilitation includes two identical lever mechanisms located in a mirror, each of which is connected through a traverse with a rack through hinges connected in series. The axes of the first and second hinges are oriented to the center of the shoulder joint, the third hinge is connected to the second, and, in addition, to the first output link of the lever mechanism, the fourth hinge is connected to the first, the first output link of the lever mechanism is connected to the shoulder through the supporting element and to the second output link. link through the hinge, the axis of which is coaxial with the axis of the elbow joint, all hinges are equipped with active drives. Active drives are installed coaxially with the hinge axes, the axis of the third hinge is coaxial with the axis of the first output link, and the axes of the first and second hinges are located in the range of angles from 85-95°.

The disadvantages of this device are the lack of mobility, due to the bulky design, the need for complex preparatory settings, impossibility of rehabilitation of patients in the sitting and supine position, and impossibility of rehabilitation of the patient's arm extreme segment.

There is a known device for developing the mobility of the shoulder joint (see patent of the Russian Federation No. 2653811, IPC A61N 1/00, IPC A61N 1/02, publ., 14 May 2018).

The device comprises a base equipped with rollers for movement, a patient seat placed on the base, a vertical stand made adjustable in height, an electronic control unit attached to the base, a control panel electrically connected to the electronic control unit, the first reversible gear motor electrically connected with the corresponding output of the electronic control unit, the first and second rods, the second reversible gear motor electrically connected to the corresponding output of the electronic control unit, the first and second angle sensors, the rotors of which are rigidly connected to the output shafts of the first and second reversible gear motors, respectively, and their electrical outputs are connected to the corresponding inputs of the electronic control unit, two position regulators, each equipped with an angular scale with a lock and attached to the patient's seat from different sides, a healthy arm placement unit installed on one of the position regulators and consisting of an armrest with an adjustment pin and its latch, the host for the arm being developed, formed by the third rod, in the middle part of which there is a tray, and at the ends of this rod there are respectively an elbow rest and a handle, an L-shaped lever, one end of which is mechanically connected to the second motor-reducer, and the other to its the end is connected to the third bar. One end of the first rod is kinematically connected to the output of the first reversible gear motor, and its other end is connected through a hinge to one end of the second rod, at the other end of which the second reversible gear motor is located. On the other position controller, a vertical post is installed, at the upper end of which the first reversible motor-reducer is placed. The first and third rods are made adjustable in length.

The disadvantages of this device are the lack of a folding structure, low mobility, the inability to use for the rehabilitation of low-mobility patient's and patients in supine position.

There is a known device biofeedback device for the rehabilitation of the joints of the hands and fingers and a method for its operation (see patent Russian Federation No. 2720323 PMK A6TV 5/00, publ., Apr. 28, 2020).

Device consists of a control module made in the form of a hollow plastic case fixed on the patient's forearm, a motor module for flexion/extension of the hand, while it is equipped with a stepper motor for flexion/extension of the hand, a control module with a control microcontroller located in the module, a stepper motor controller for flexion/extension of the hand and a controller for controlling the servo. The control module of the simulator is fixed on the outer side of the forearm of the patient's diseased hand, the patient's fingers are inserted into the fingers of the glove and the fingers of the glove are fixed on the substrate for fixing the fingers of the glove, the patient's palm is fixed on the support-fixator of the hand, sensors are fixed on the patient's healthy hand on the middle and index fingers for measurements of the galvanic skin response of the patient.

The specified technical solution relates to the field of meeting the vital needs of a person. It can be used in medicine for the rehabilitation (restoration) of motor activity and range of motion of the joints of the hands and fingers, impaired due to injuries or diseases suffered by a person, for example, a stroke, and in the field of sports, for example, for the targeted development of tone and strength of the muscles of the hands and fingers hands, e.g. climbers, climbers.

The disadvantage of this device is the limited use—the device can only be used to restore the mobility of the rehabilitation of fingers and hands, as it is equipped with drives only for these segments of the limb.

There is a known device for rehabilitation (see the patent of the Russian Federation No. 2427361 IPC A61H 1/02, A61H 3/00, A61F 5/01 publ., 27 Aug. 2011) comprising a first frame located along the first skeletal part extending from the joint, a second frame located along the second skeletal part extending from the joint in a direction different from the direction of the first skeletal part, a rotation angle sensor configured to detect the position by the rotation angle between by the first frame and the second frame, a biosignal sensor on the flexion side, configured to detect the biosignal of the flexor muscle, a biosignal sensor on the extension side, configured to detect the biosignal of the extensor muscle, a calibration unit, configured to determine the correction amount on the flexion side and the value corrections on the extension side separately, and a memory unit configured to store individual biosignal correction values different for individuals, the correction value on the flexion side and the correction value on the extension side.

The disadvantages of this device are low mobility of the device; the inability to carry out rehabilitation in the supine position; the device cannot be used for rehabilitation of patients with severe plegia.

There is a known robotic rehabilitation apparatus and method (see the description of the patent CA2678425A1, Canada A61H 1/00 publ. 21 Aug. 2008). The invention is an intelligent robotic rehabilitation device with 8+2 degrees of freedom, capable of separately controlling the position of the shoulder, elbow, wrist and fingers and providing the function of arm movement accompanied by movements of the torso and scapula. The device uses the following comprehensive rehabilitation approach: 1) has unique capabilities to identify patient-specific multiple articular and/or multiple biomechanical degrees of freedom and neuromuscular changes; 2) intelligently controlled stretching of rigid joints in certain directions/reducing movements in specific joints and reducing excessive stress/fracture movements between specific joints/which is done based on a specific diagnosis for individual treatment; 3) patients perform voluntary movements and some functional tasks to restore/improve their motor abilities, which is done after joint stiffness is relieved by stretching; and 4) the result is quantified for each joint, multiple joints/DOFs, and the entire arm.

This invention relates to devices for diagnostics, training and evaluating human limbs, in particular, to robotic devices that allow for rehabilitation, including accurate diagnosis in the entire working space of the limbs, limb stretching under intelligent control, limb movement training using voluntary exercises and performing evaluation of results.

This device allows to stretch the muscles and joints of the limb being rehabilitated. To do this, the device is equipped with a mechanism for dosing the load on each of the joints of the arm, additionally, due to the specifics of the application, the device is equipped with mechanisms that allow to adjust the variable parameters to the anatomical features of a person, thereby maximally protecting the patient from traumatic effects.

The device contains:

- a limb support, wherein said limb support fixes the limb so that said limb can rotate at the joint/degree of freedom;
- a motor having a motor shaft, said motor shaft rotating at variable speed and mounted on said limb support, said joint rotatable relative to said motor shaft, said joint aligned with said motor shaft;
- a torque sensor, said torque sensor being located between said motor and said limb support, said torque sensor measuring the amount of resistance torque applied by said connection; and
- a controller connected to said torque sensor and to said engine, the engine adapted to decrease said speed reported by the controller in response to an increase in resistance torque reported to said controller from said torque sensor.

This device is the closest analogue to the proposed invention in terms of the largest number of similar features, technical essence, engineering solution and the achieved medical and technical result both for the device as a whole and for its part, as well as for the method of using the device.

The disadvantages of this device is its large size, and as a result—low mobility making it difficult to use at home, necessity for long preparation of the device for use, inability to use for rehabilitation in the supine position.

The robotic device presented in current application, is devoid of these disadvantages.

SUMMARY OF THE INVENTION

There are numerous details of the implementation in the following description of the implementation of the invention, targeted to provide a clear understanding of the present invention. However, it will be obvious to one skilled in the art how the present invention can be used, both with and without these implementation details. In other instances, well-known methods, procedures, and components have not been described in detail so as not to unnecessarily obscure the features of the present invention.

In addition, from the foregoing it is clear that the invention is not limited to the above implementation. Numerous possible modifications, alterations, variations, and substitutions that retain the spirit and form of the present invention will be apparent to those skilled in the art.

The present invention—a robotic device for use in systems for motor rehabilitation is aimed at solving a technical problem associated with the design of motor rehabilitation equipment that meets the requirements of mobility, compactness, safety, providing the opportunity to carry out rehabilitation of patients in a lying or sitting position, in a hospital or at home, with a completely immobilized limb or with a limb with limited mobility, perform movements of the rehabilitated limb in several planes and similar to natural, provide individual settings for each patient, allowing the most effective personalized rehabilitation.

The proposed device can be used for rehabilitation of both upper and lower extremities. However, in the following text of the description, for its greater clarity, the operation of the device is disclosed on the example of the rehabilitation of the upper limb (arm), and accordingly, instead of the terms of the formula "middle segment of the limb" and "extreme segment of the limb", the terms "forearm" and "hand" can be used.

The objective of the invention was to create a design that allows providing:

- mobility and compactness, for example, due to the use of movable supports equipped with casters, as well as folding and transformable design, or a compact table-top with a movable, or a non-movable base and support, or integrated housing;
- safety, due to the presence of movement limiters and an emergency stop system;
- stability, due to the presence of adjustable supports and casters with stoppers, or stable housing;
- comfort and ease of use for the patient, due to the adjustable configuration of the device and supports, allowing to install the device in a stable position, regardless of the configuration of the furniture on which the patient is located and the individual limitations of the patient;
- simplicity and reliability of the design, which, at the same time, allow, due to the original kinematic scheme using one to three simple drives, in which complex movements in the shoulder and elbow joints are achieved only by moving the limb cradle along a linear guiding rail, to achieve a large range of limb movements similar to physiologically natural trajectories;
- the possibility of personalized rehabilitation due to settings according the individual characteristics of the patient: the height, length of the limbs (due to the variable height of the stand and the position of the guiding rail), safe and adjustable range of motion (due to movable limiters), individual restrictions (due to the possibility of adjusting the device configuration);

reducing the time required for a rehabilitation session through the use of elements and components that allow to individually setup the device for each patient in a short period of time;

versatility of use: changing the configuration and position of the device around the patient makes it possible to change the side of the body being rehabilitated (due to the symmetrical design), to used by patients in different positions (sitting, half-sitting, lying, etc.) and with varying degrees of paralysis, due to the variability in configurations;

the ability to carry out rehabilitation training both in a hospital and at the patient's home, through the implementation of a folding mobile design;

reduction of the area of the premises needed for rehabilitation training, due to the compact design of the device and the possibility of its storage in a folded position;

safety of rehabilitation through the use of an emergency stop system and limiters that do not allow the patient's limb to reach a dangerous position, even in the event of a device breakdown.

The technical result of the invention is a design of equipment for motor rehabilitation that meets the conditions of mobility, compactness, safety, which makes it possible to carry out rehabilitation of patients in a lying or sitting position, in a hospital or at home, with a completely immobilized limb or with a limb with limited mobility, carry out the movement of the limb being rehabilitated in several planes and close to natural, provide individual settings for each patient allowing the most effective personalized rehabilitation and thereby increasing the efficiency of motor rehabilitation.

The proposed device is foldable, compact and mobile, designed for easy transportation by one person, including in public transit. Due to this, it can be used both in a hospital and at home, which allows for full-fledged rehabilitation measures for patients with limited mobility despite their limitations.

The device uses the natural kinematics of the human body to implement fairly complex movements of a paralyzed limb with a high degree of similarity to natural voluntary movements that would be performed independently by a healthy limb. Due to this, it was also possible to ensure the simplicity and reliability of the design and control. The kinematic diagram of the device operations is shown in FIG. 9-13.

The application scenario of the proposed invention involves a kinesthetic and proprioceptive effect on the limb being rehabilitated, triggered by the results of measuring the patient's cognitive and/or muscle activity or according to the rehabilitation program in order to provide the patient with multisensory feedback during the execution of movements in course of rehabilitation exercises and thus activate the neuroplasticity process restoring neural connections damaged due to a disease or for the purpose of providing motor assistance, in the case of rehabilitation of patients with loss of motor functions of the limb caused by spinal cord injury or other reasons.

The technical result is achieved by a robotic device for the limb rehabilitation system, including a base with supports; a stand attached to the base; guiding rail fixed on the stand; the carriage moving along the guiding rail, with the arm cradle assembly attached to it by a swivel; a drive that moves the carriage and the assembly along the rail; a system and/or sensors for determining the position of the device elements; drive control unit connected to a computer with installed software; emergency stop module; power source;

where:

the stand is attached to the base with the ability to change the inclination and/or rotation relative to the base; the guiding rail is fixed on the stand with the ability to change and fix the position of the attachment point of the rail to the stand, as well as change and fix the angle of inclination of the rail relative to the stand and/or the angle of rotation relative to the vertical axis of the stand; the software installed on the computer is configured to process signals from the control unit and/or from the system for determining the position of the device elements.

The robotic device may include a controllable actuator with a sensor to change stand height.

At least one support of the base can be made with the ability to change the angular position, and also be able to change the length. At least two supports may have casters with stoppers.

The stand of the robotic device can be made with the possibility of fixing the angle of inclination to the base in at least two positions, as well as changing the height during the exercise.

The drive for moving the carriage or the guiding rail may have movement limiters.

The guiding rail of the robotic device can be made straight or curved.

The limb cradle assembly can be made removable.

The device may have a telescopic handle for transportation when folded.

As a component for placing a limb, an exoskeleton of a limb or its part can be used, or a special assembly which includes a base with a cradle of the middle segment of the limb fixed on it; a base pivotally attached to the base of the cradle of the middle segment of the limb with a cradle of the extreme segment of the limb attached to it; a drive for setting the base of the cradle of the extreme segment of the limb in motion; system and/or sensors for determining the position of the assembly elements.

The drive for setting the base of the cradle of the extreme segment of the limb in motion may have movement limiters.

The system and/or sensors for determining the position of the elements can be fixed on the corresponding elements of the assembly, or made based on optical technology and placed remotely.

Cradles can be made removable and adjustable.

The base of the cradle of the middle limb segment can be movable along its longitudinal axis, the cradle of the extreme limb segment can be made in the form of an exoskeleton.

The technical result is achieved by using a robotic device as part of the system for the rehabilitation of limbs, in which the rehabilitated limb is moved while maintaining the natural angular degrees of freedom of the upper and middle joints of the limb and the natural range of motion due to the design of the base and the stand, allowing an anatomically natural position of the limb during movement, moving the middle and/or the extreme segment of the limb while maintaining the natural anatomical angles in the joints and the trajectories of movement of the segments of the limb due to the possibility of moving the middle segment of the limb together with the cradle with at least one degree of freedom along the longitudinal axis of the cradle, and maintaining at least two angular degrees of freedom of the middle segment of the limb by fixing the base of the cradle of the middle segment of the limb to the carriage using a swivel or hinge with at least two angular degrees of freedom, and bringing the carriage into linear motion with the help of a drive, the extreme joint of the limb is being moved providing natural angular degrees of freedom in the joint and the trajectory of the movement of the extreme segment due to placing the limb in the cradles so that the joint connecting the middle and extreme segments of the limb is in the projection of the hinge connecting the bases of the cradles of the middle and extreme segments of the limb, and bringing the extreme segment of the limb into angular displacement and relative to the middle segment with the help of a drive; at the same time, the control of the movement of the elements of the device due to the operation of the drives is carried out by the control unit for the operation of the drives, connected to a computer with the software installed on it, receiving from the control unit information about the position of the drives, and from the system for determining the position of the elements of the device—information about the position of the elements, and sending commands to the control unit that control the operation of the drives.

The essence of the proposed solutions is illustrated by the following description and the attached figures.

DETAILED DESCRIPTION OF THE INVENTION

Figure 1:
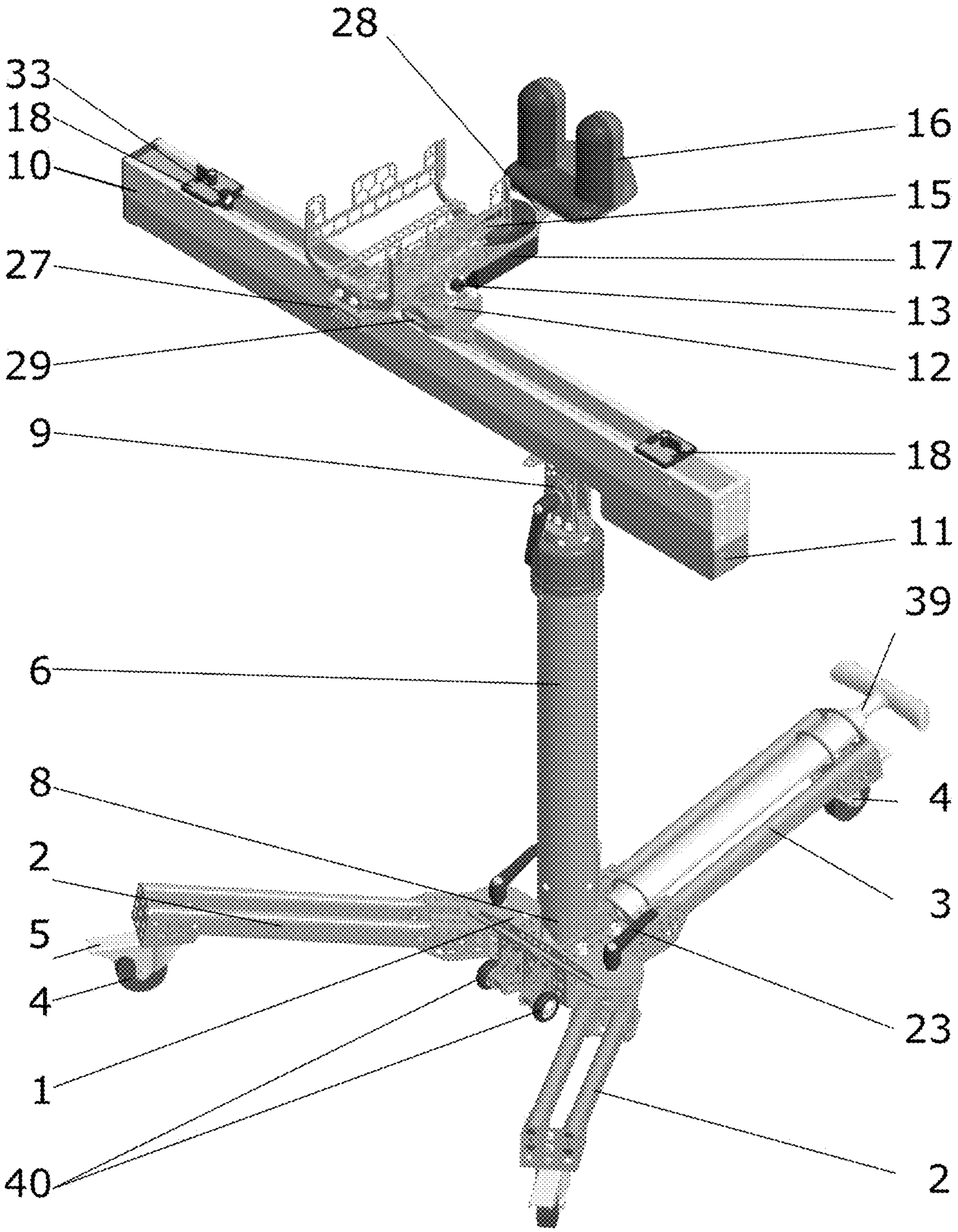
FIG. 1 shows a general view of a robotic device for limb rehabilitation.
Figure 2:
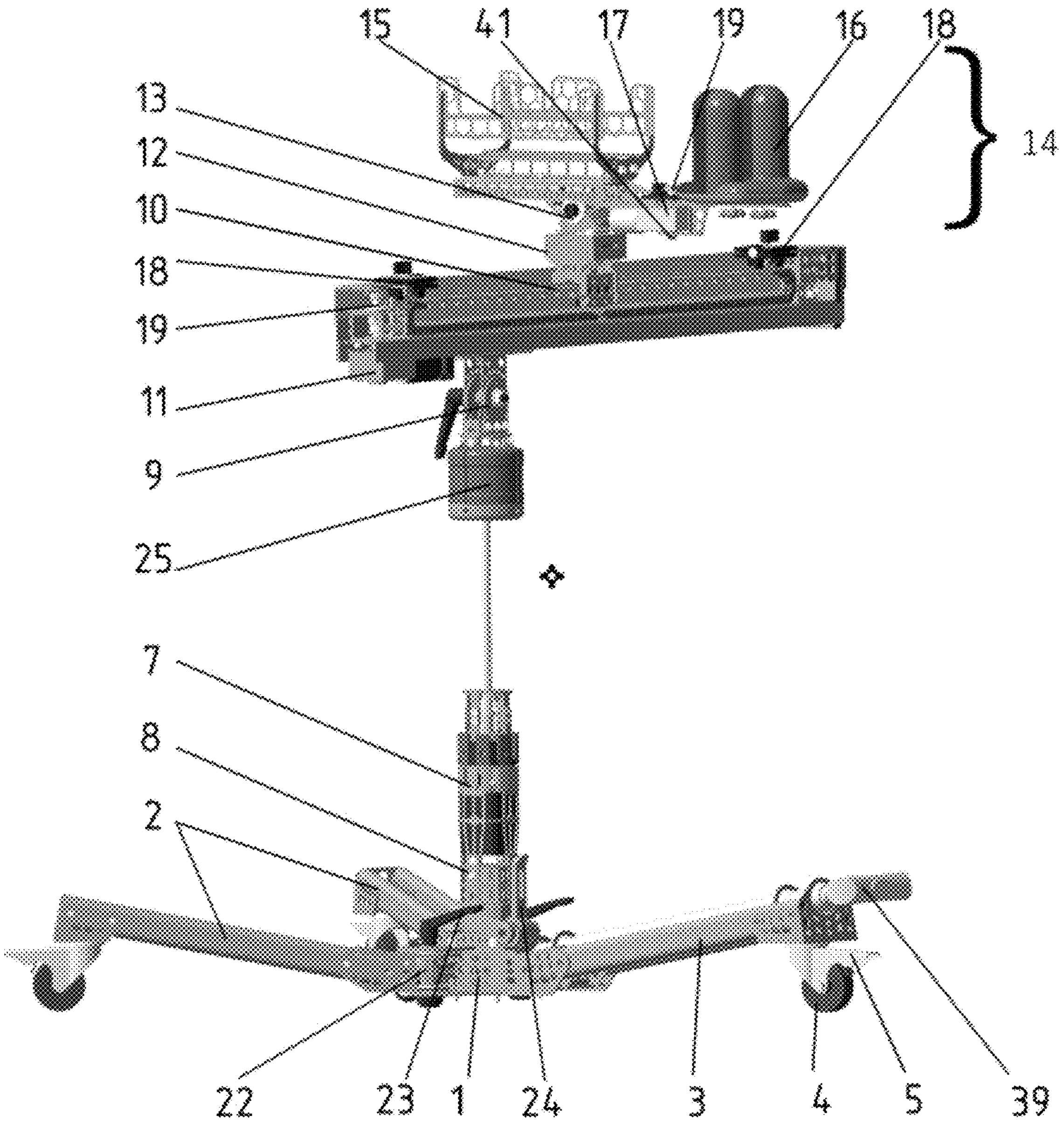
FIG. 2 shows a view of the robotic device with the stand housing removed and the guiding rail housing side wall removed.
Figure 3:
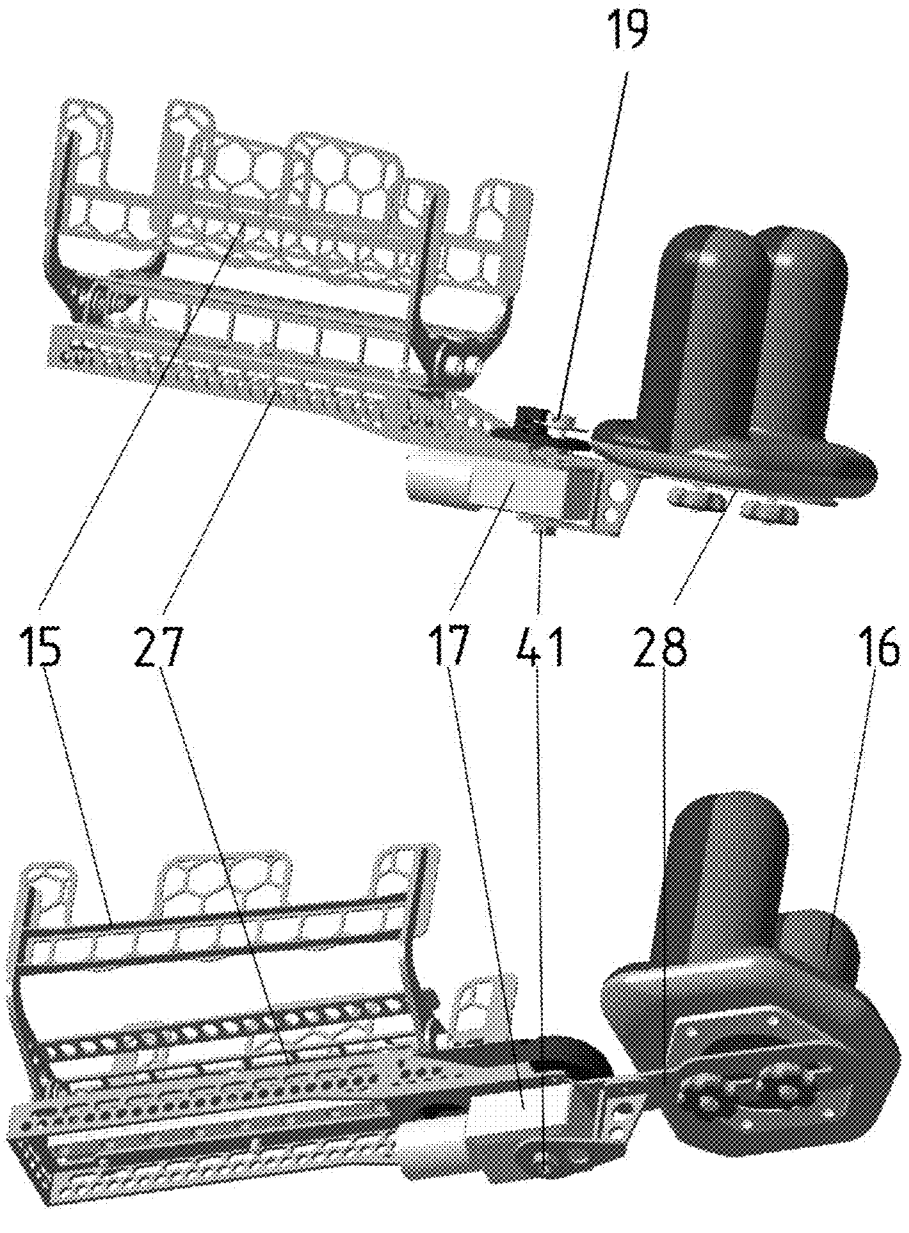
FIG. 3 shows the components of the limb holding assembly (14).
Figure 4:
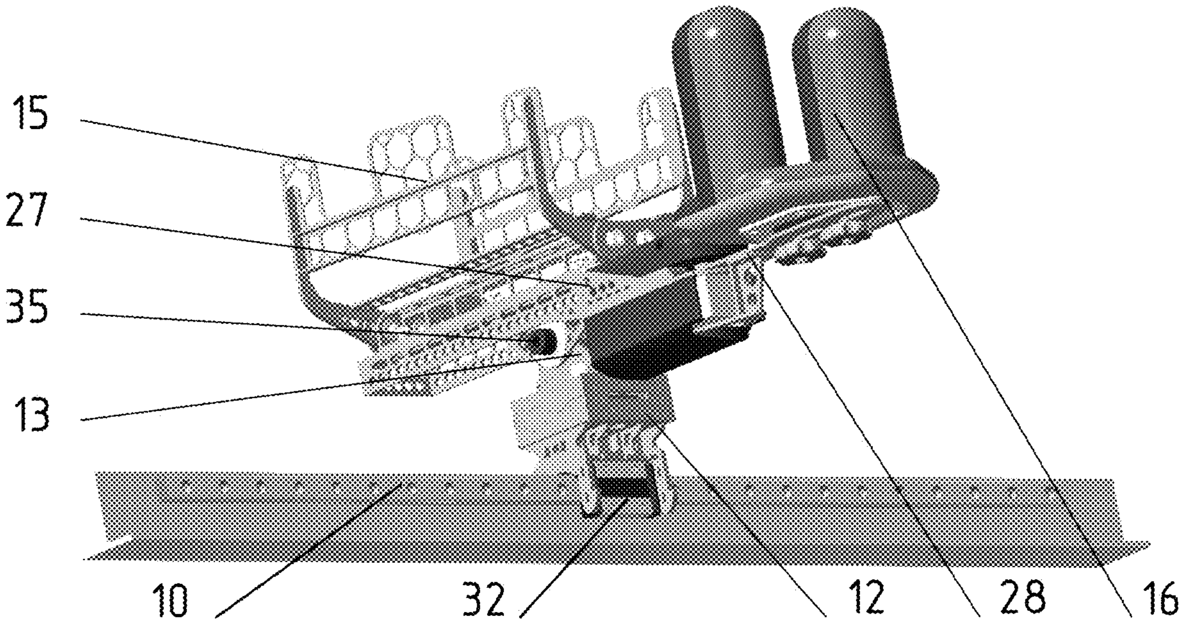
FIG. 4 shows the components for attaching the carriage (12) to the guiding rail (10).
Figure 5:
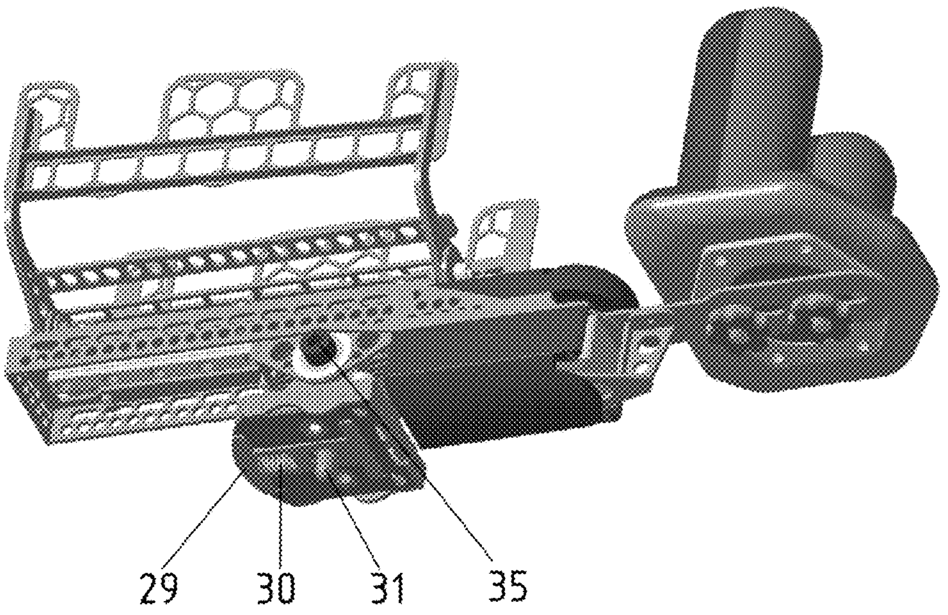
FIG. 5 shows the components for fastening the limb cradle assembly (14) to the carriage (12).
Figure 6:
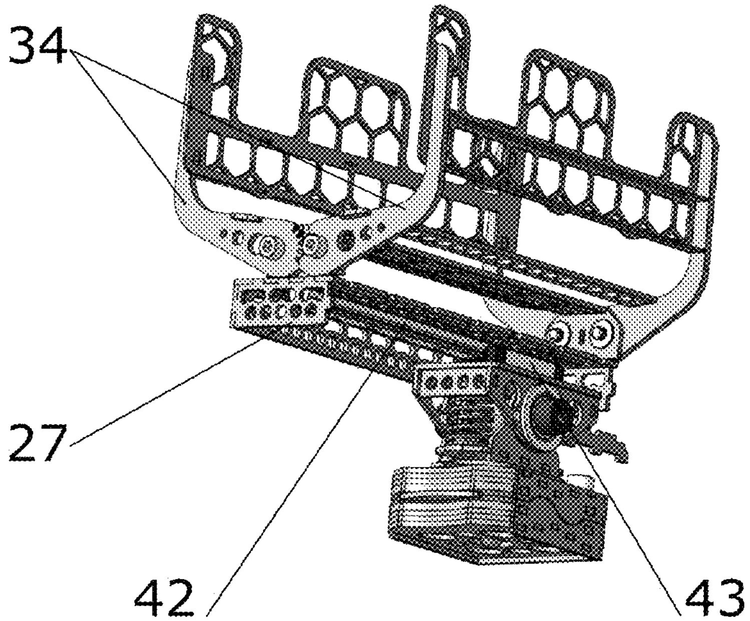
FIG. 6 shows the components of the forearm cradle (15).
Figure 7:
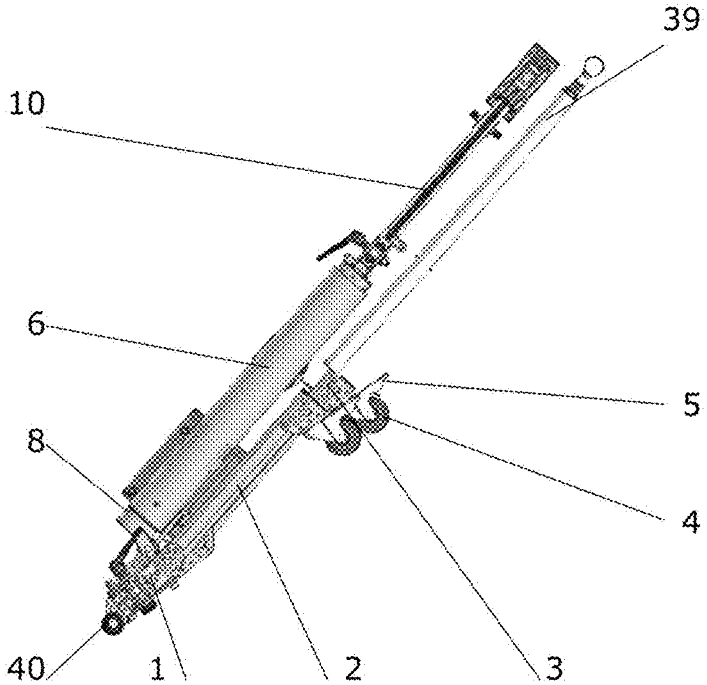
FIG. 7 shows a robotic device folded to a transportation position.
Figure 8:
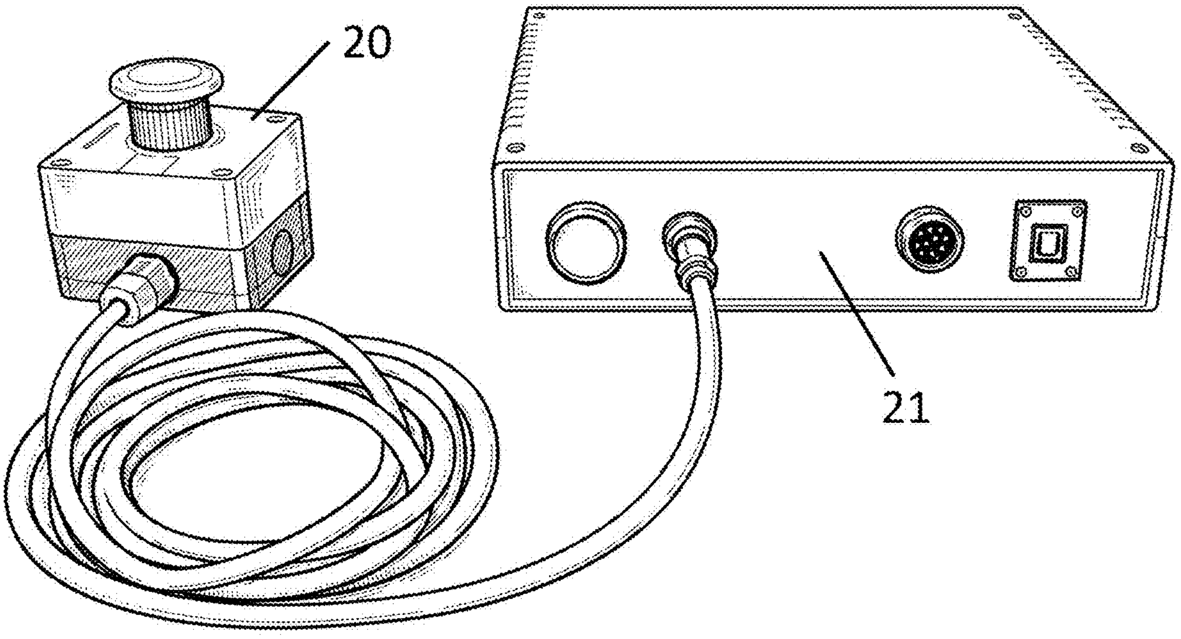
FIG. 8 shows the emergency stop system and the drive control unit.
Figure 9:
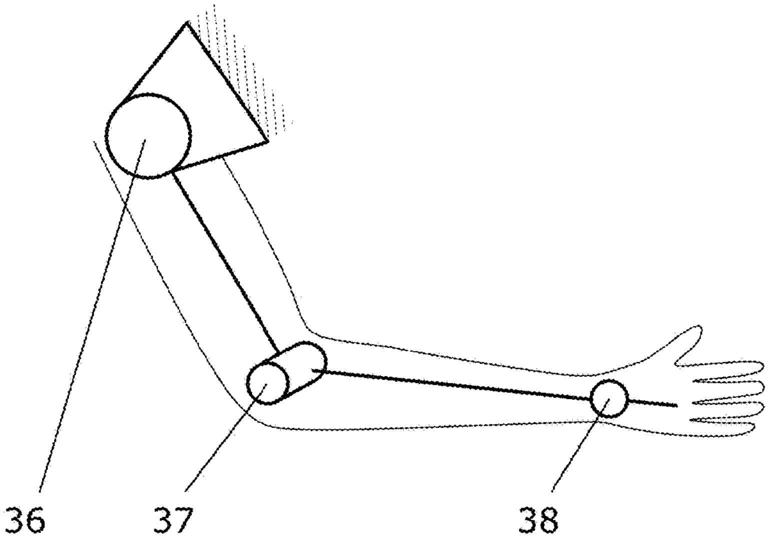
FIG. 9 shows a kinematic diagram of a human arm.

The device, in the design version shown in FIG. 1-8 (but this version is not the only possible one for the proposed invention) contains:

- a base (1) made with supports (2,3) attached to it with the possibility of adjusting the length of the supports (2,3) and the angular position of the movable (2) supports; while the supports are made with casters (4) with stoppers (5);
- a handle (39) attached to the base (1), made with the possibility of folding and unfolding, and intended for transporting the device in the folded (transport) position;
- a stand (6) hinged on the base (1) and made with the possibility of changing height using an actuator drive (7), and changing the angle of inclination to the base using a hinge (8), as well as fixing the angle of inclination with a lock (24) and having a joint (25) in which the upper part of the stand is rotated relative to the lower part, and where their positions can be fixed;
- the attachment assembly (9) fixing the guiding rail (10) located at the top of the stand (6), made in the form of a hinge or joint with at least one angular and one linear degree of freedom;
- a guiding rail (10) fixed on the stand (6) with the help of the attachment assembly (9), made with the ability to change the position of the place of attachment to the stand (6) and the angles of inclination and rotation with respect to the stand (6) with the help of the attachment assembly (9);
- a carriage (12) moving along the guiding rail with the help of a drive (11), made in the form of a housing connected to the rail through a linear bearing (32);
- a hinge (13) mounted on the carriage for fixing the limb placement assembly (14), made with the ability to remove the limb placement assembly (14) from the carriage (12) by releasing the latch (29), and with the possibility of providing two angular degrees of freedom due to rotation around two axes (31, 35);
- limb placement assembly (14), made in the form of the base of the forearm cradle (27) and the base of the cradle (handle) of the hand (28) connected to each other by axle (41), with the possibility of changing the angle between the bases using the drive (17), as well as with the possibility of moving the base of the forearm cradle (27) along its longitudinal axis by sliding the guide of the base of the forearm cradle (42) along the linear bearing (43) fixed on the hinge (13);
- quick-detachable or adjustable forearm cradle (15) and hand cradle (16) fixed on the base of the forearm cradle (27) and on the base of the hand cradle (28) respectively, made with the ability to fix the patient's forearm and hand with the help of straps (not shown in the illustrations);
- movement limiters (18), in the described design solution, made in the form of mechanical stops, including magnets (33) to activate Hall sensors (not shown in the illustrations);
- a system for determining the position of moving elements of the device and of the limb holding assembly, further referenced a sensor system (19), which can be made in the form of a system of mechanical, optical or electronic sensors and their controllers, or a combination of such sensors and controllers;
- an emergency stop system, in the described design made in the form of an emergency stop button (20) and Hall sensors (not shown in the illustrations) placed on the carriage (12), transmitting to the drive operation control unit (21) information about approaching to permanent magnets (33) located in the movement limiters (18);
- drive operation control unit (21), made in the form of an electronic unit that processes information from the sensor system (19), transfers it to a computer with the software installed on it, and also receives commands from this software based on which it generates and transmits commands to drives;
- power supply, in this design, made in the same housing with the drive control unit (21).

The hand cradle (16) can also be made in the form of a hand exoskeleton (not shown in the illustrations), which is a mechanical structure covering the hand as a whole and\or each finger separately, with the ability to bend and unbend each finger separately and/or the hand as a whole, using a controlled drive or drives.

The proposed device works as follows.

In the position for transportation and storage, the stand column (6) is tilted by means of a hinge (8) to a position parallel to the fixed support (3) and fixed with a lock (24). Movable supports (2) which can change their angular position due to rotation around the axes (22) are brought to a position parallel to the fixed support (3) and fixed with clamps (23). The guiding rail (10) with the help of the attachment assembly (9) is brought to a position parallel to the stand column (6). The limb placement assembly (14) can be removed from the carriage (12) by releasing the latch (29), or brought to a position parallel to the stand (6). The stand (6), supports (2,3), guiding rail (10) and the limb placement assembly (14) (if it has not been removed) are fixed together with a strap (not shown in the illustrations). The handle (39) is brought into transport (extended) position. Further, the device is transported by the handle (39) using transport casters (40) located in the lower part of the base (1). When storing the device, the handle (39) is folded.

To bring the device from the transport position to the working position, the handle (39) is folded, the fixing strap is removed and the movable supports (2) are unfolded with possibility to change their length (not shown in illustrations) and angular position due to rotation around the axes (22). Then the stand (6) is being brought into working position by changing its angle of inclination with respect to the base (1) in the hinge (8), and fixation with a lock (24). By adjusting the position and length of the supports (2,3), as well as the inclination of the stand (6), the optimal configuration of the device is selected based on the position of the device relative to the patient and from the configuration of the furniture (chair, couch, medical bed, etc.) on which the patient is located. The supports are fixed in the selected position with the help of clamps (23) and casters stoppers (5).

In order to achieve the position of the limb placement assembly (14) relative to the patient that is optimal for the exercise being performed, taking into account their anatomical features, the height of the stand (6) is changed using the actuator drive (7), and with the help of the attachment assembly (9) change the angle of the guiding rail (10) relative to the stand (6). In this case, the rotation of the guiding rail (10) relative to the axis of the stand during adjustment is carried out by turning the upper and lower parts of the stand relative to each other in the joint (25). Thus, the guiding rail can take a vertical, horizontal, inclined position, and be directed parallel, perpendicular or at any other angle to the frontal plane of the patient, thereby ensuring the movement of the limb along various trajectories, anatomically similar to natural movement trajectories.

When performing the exercise, the carriage (12) with the help of the drive (11) moves along the guide due to the linear bearing (32) connecting the guiding rail (10) and the carriage (12). In this case, the limb placement assembly (14) with the limb fixed in it moves along the guiding rail along with the carriage (12). Due to the fact that the limb placement assembly (14) is attached to the carriage using a hinge (13), which provides two angular degrees of freedom, and the forearm cradle (15) has the ability to move longitudinally along the axis of the base of the forearm cradle (27), anatomically natural movements can be achieved.

The limb holding assembly (14) is attached to the hinge (13) by the base of the forearm cradle (27), on which base the forearm cradle (15) is fixed, and the base of the hand cradle (28) with the hand cradle fixed on it (16) is fixed on the axle (41) of a drive (17) attached to the base of the forearm cradle (27), thus forming a hinge connecting the cradles bases. Flexion of the wrist during the exercise is provided due to the angular movement of the cradle of the hand (16) relative to the forearm cradle (15) with the help of the drive (17). In the embodiment of the device, when the hand cradle is made in the form of a hand exoskeleton (not shown in the illustrations), due to the operation of the hand exoskeleton drives, fingers are also flexed and extended during the exercise.

Figure 11:
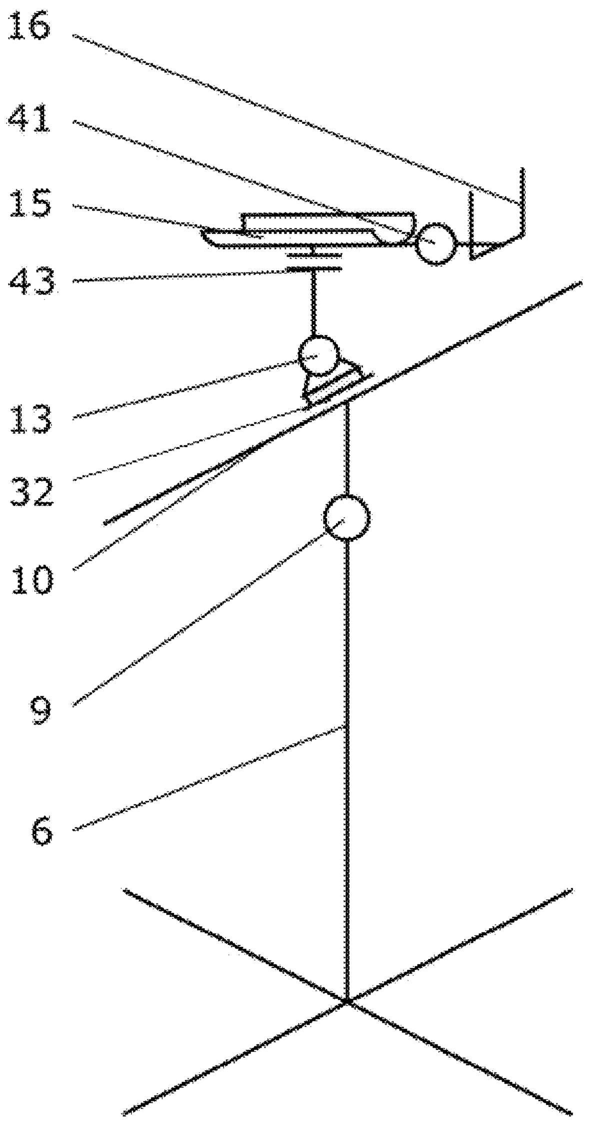
FIG. 11 shows the kinematic diagram of the proposed robotic device.
Figure 12:
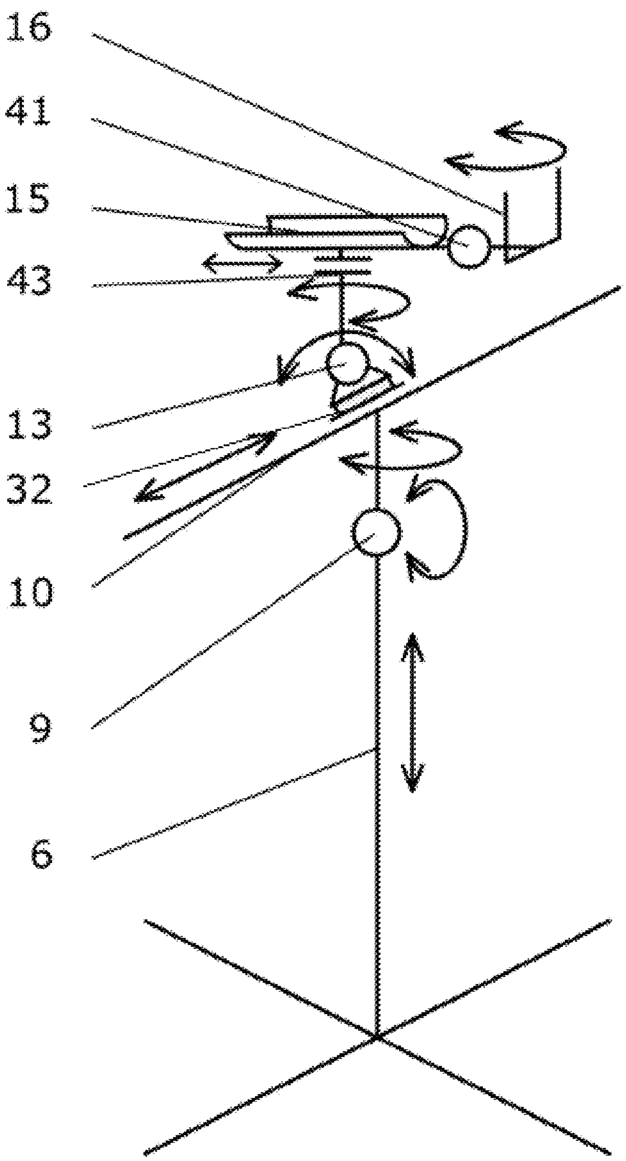
FIG. 12 shows the degrees of freedom of the components of the robotic device.
Figure 13:
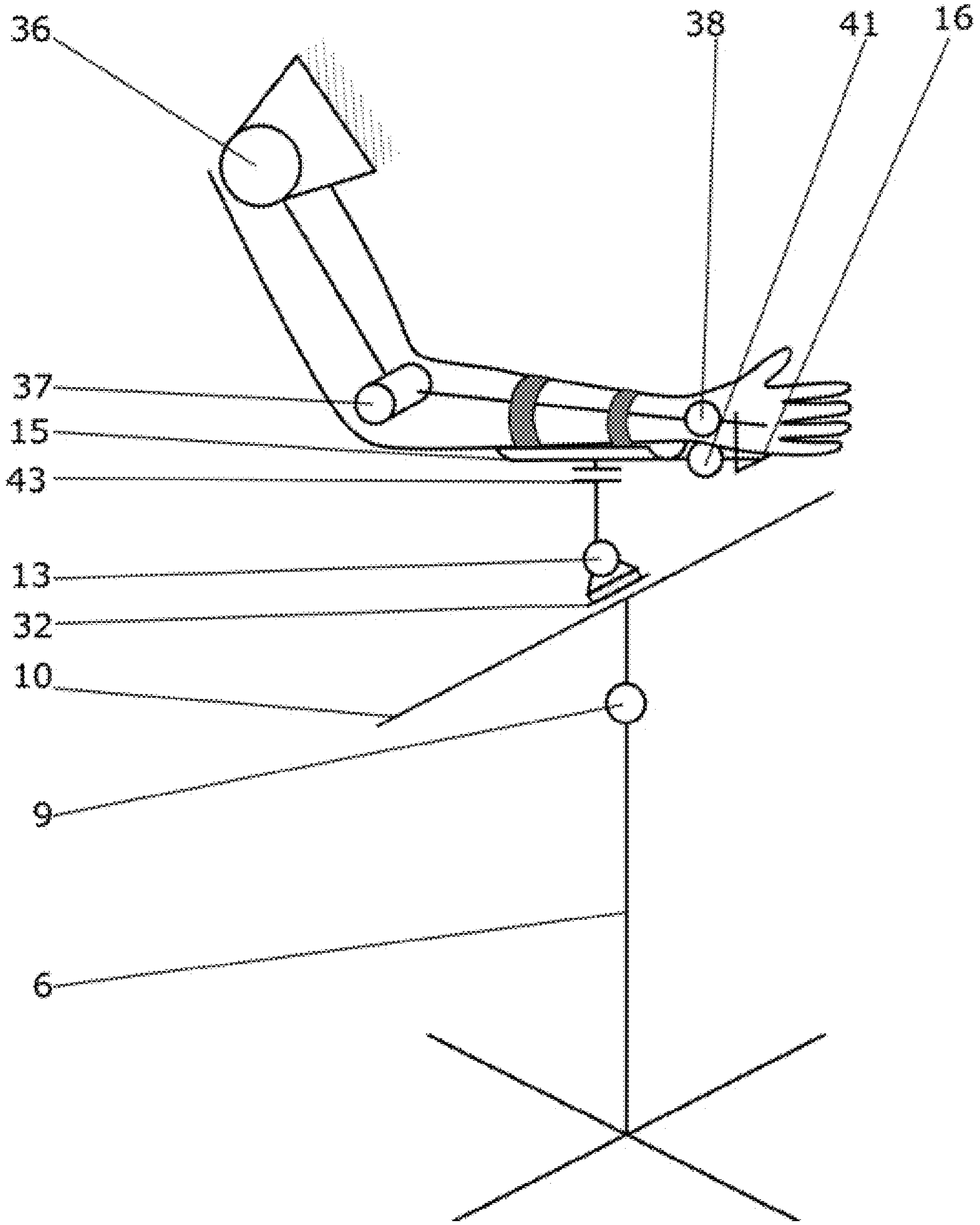
FIG. 13 shows the kinematic diagram of the patient's arm and the device during rehabilitation exercise.

To ensure compliance with the anatomical dimensions of the patient's limb, the forearm cradle (15) can be made quick-release (not shown in the illustration) or adjustable in width (as shown in FIG. 11). The width-adjustable cradle embraces the patient's forearm with anatomically shaped half cradles (34) hinged to the base of the forearm cradle (27), after which the half cradles (34) are fixed with straps (not shown in the illustrations) to securely fasten the patient's arm.

Figure 10:
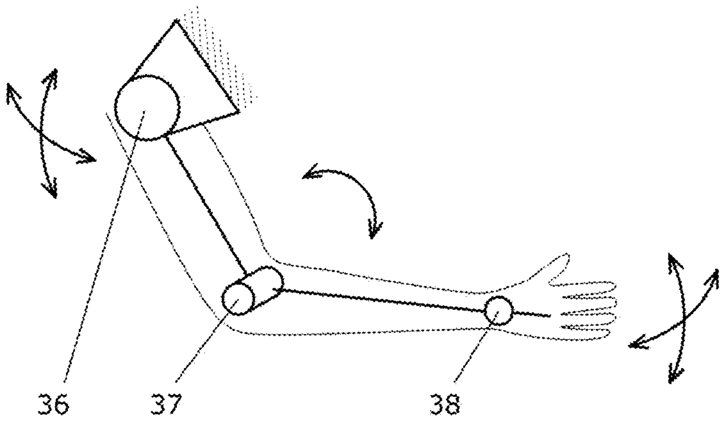
FIG. 10 shows the degrees of freedom of the joints of the human arm.

The limb placement assembly (14) has a detachable connection, implemented through the use of an axle with a transverse groove (31), a spring (30) and a latch (29), which allows to quickly remove the limb holding assembly (14) from the carriage (12) (see FIG. 10) to replace, repair or bring the device into transport position.

During operation of the device, the movement of the carriage (12) along the guiding rail (10) and the hand cradle (16) relative to the forearm cradle (15) is limited by the movement limiters (18).

The sensor system is implemented in the described example design based on encoders (19) and transmits data on the movement of elements to the drive operation control unit (21), which processes this information, transfers it to the PC software, and receives back commands for moving elements, converts them into commands for turning on and off drives (11) and (17), as well as commands for controlling the speed and direction of movements.

When performing the exercise, the patient's arm is placed in the forearm cradle (15) and the hand cradle (16) so that the wrist joint (38) is in the projection of the axle (41) connecting the bases of the hand cradle and the forearm cradle. Flexion/extension of the wrist is carried out due to the angular rotation in the axle (41), while the similar natural movement will be achieved due to the location of the hinge in the projection of the wrist joint (38).

The described design allows moving the patient's arm maintaining the similar to natural motions of the latter. As an example, the patient is in a sitting position, the robotic device is in front of the patient, the linear guiding rail (10) is oriented horizontally and installed at a height convenient for the patient, the patient's forearm is fixed in the forearm cradle, and the hand is fixed in the hand cradle. When the carriage moves along the guiding rail (10), the patient's arm begins to move along with it due to the abduction/adduction of the arm in the shoulder joint (36), while the mobility of the arm in the elbow joint (37) and the mobility of the forearm cradle in the linear bearing (43) is allowed due to a slight flexion/extension of the arm in the elbow joint (37) and tilt and rotation of the forearm cradle (15), which compensates for this bend, to maintain the natural position of the arm at any moment of movement.

In the tabletop version of the proposed device the guiding rail is mounted within the housing to be placed on the top of a table. Having certain limitations in terms of range of provided motions, this version is more compact and convenient to transport, store and use, less expensive to produce and maintain, and easier to set up.

Due to the fact that the design of the device involves a large number of settings, including (but not only):

adjustment of the angular position and length of the supports;

adjustment of the height and angular position of the stand;

adjustment of the angle of inclination and rotation of the guiding rail relative to the stand;

changing the junction of the guiding rail with the stand;

range of movement of the carriage along the guiding rail;

the range of angular freedom in the vertical plane in the hinge connection of the carriage with the limb placement assembly;

degree of freedom of linear movement of the forearm cradle relative to the longitudinal axis of the cradle;

range of angular movement of the hand cradle relative to the forearm cradle, and the device can be located in different positions relative to the patient by varying the angular position and length of the supports, the height and angle of rotation of the rail relative to the stand, using the device, for example (but not only), the following movements of the limb can be performed:

longitudinal and transverse movement in horizontal, vertical planes flexion/extension, horizontal abduction/adduction, internal/external rotation in the shoulder joint;

flexion/extension in the elbow joint;

flexion and extension in the wrist joint;

complex movements that combine several elementary movements and imitate everyday actions for example, opening a door, bringing a cup to a mouth and taking a sip from it, picking a fruit from a tree, etc.

Thus, the use of the claimed invention solves the technical problem associated with the design of robotic equipment for motor rehabilitation that meets the requirements of mobility, compactness, safety, which makes it possible to carry out rehabilitation of patients in a lying or sitting position, in a hospital or at home, with a completely immobilized limb or with a limb with limited mobility, perform the movement of the limb being rehabilitated in several planes and close to natural and those performed in real life, provide individual settings for each patient, allowing the most effective personalized rehabilitation.

The present application materials provide a preferred disclosure of the claimed technical solution, which should not be used as limiting other, private embodiments of its implementation that do not go beyond the scope of the requested legal protection and are obvious to specialists in the relevant field of technology.

The invention claimed is:

1. A robotic device for a limb rehabilitation training system, comprising:

a base with a plurality of supports;

a stand attached to the base;

a guiding rail fixed on the stand;

a carriage moving along the guiding rail, to which a limb holding assembly is hinged;

a drive that moves the carriage and a limb holding assembly along the guiding rail;

a system and/or sensors for determining positions of the base, the stand, the guiding rail, the carriage, and the limb holding assembly;

a drive control unit connected to a computer with installed software;

an emergency stop device; and a power unit, wherein:

the stand is attached to the base with the ability to change the inclination and/or rotation relative to the base;

the guiding rail is fixed on the stand with the ability to change and fix the position of an attachment point of the guiding rail to the stand as well as change and fix an angle of inclination of the guiding rail relative to the stand and/or an angle of rotation relative to the axis of the stand; and the software installed on the computer is configured to process signals from the control unit and/or from the system and/or the sensors for determining and changing positions of the base, the stand, the guiding rail, the carriage, and the limb holding assembly.

2. The robotic device according to claim 1 further comprising a controlled drive with a position sensor to change the stand height.

3. The robotic device according to claim 1, wherein at least one support of the plurality of supports can change its angular position.

4. The robotic device according to claim 1, wherein at least one support of the plurality of supports can change its length.

5. The robotic device according to claim 1, wherein at least two supports of the plurality of supports have casters with stoppers.

6. The robotic device according to claim 1, wherein the stand is configured with the possibility of fixing the angle of inclination to the base in at least two positions.

7. The robotic device according to claim 1, wherein the stand is configured to change its height during an exercise performed by a user of the robotic device.

8. The robotic device according to claim 1, wherein the guiding rail has movement limiters to stop movement of the carriage.

9. The robotic device according to claim 1, wherein the guiding rail is straight.

10. The robotic device according to claim 1, wherein the guiding rail is curved.

11. The robotic device according to claim 1, wherein the limb holding assembly is detachable.

12. The robotic device according to claim 1 further comprising a handle for transportation in a folded state.

13. The robotic device according to claim 1, wherein the limb holding assembly is designed as limb exoskeleton.

14. The robotic device according to claim 1, wherein the limb holding assembly comprises: a first base with a first cradle for a middle limb segment; a second base with a second cradle for an extreme limb segment hinged to the first base of the first cradle; a second base drive to set in motion the second base of the second cradle; a limb holding assembly system and/or limb holding assembly sensors for detecting the position of the first base, the second base, the first cradle, and the second cradle.

15. The robotic device according to claim 1, wherein the base and the stand comprise an integrated housing.

16. A method of using of the robotic device for a limb rehabilitation training system according to claim 1, comprising:

carrying out motion of a limb being rehabilitated while maintaining a natural angular degrees of freedom of the joints of the limb and a natural range of motion due to a configuration of the base and the stand that allows anatomically natural positioning of the limb during movement, carrying out motion of a middle limb segment and/or an extreme limb segment while maintaining natural anatomical angles in joints of the limb segments and movement trajectories of the limb segments by moving the middle limb segment together with a first cradle of a limb holding assembly along a longitudinal axis of the middle limb segment by movement of a first base, and maintaining at least two angular degrees of freedom of the middle limb segment by a hinged connection between the first base and a second base, and driving linear motion of the first base, carrying out motion of the extreme limb segment relative to the middle limb segment while maintaining natural angular degrees of freedom in the joints connecting the middle limb segment and the extreme limb segment and a trajectory of movement of the extreme limb segment by positioning the limb such that the joint connecting the middle limb segment and the extreme limb segment is aligned with a hinge connecting the first base and the second base, and driving angular motion of the second base relative to the first base using a second base drive.

17. A limb holding assembly for a robotic device of a rehabilitation system, comprising:

a first base with a first cradle for a middle limb segment;

a second base with a second cradle for an extreme limb segment hinged to the first base of the first cradle;

a second base drive to set in motion the second base of the second cradle; and a system and/or sensors for detecting the position of the first base, the second base, the first cradle, and the second cradle, wherein the first base is configured to be movable along a longitudinal axis of the middle limb segment during an exercise.

18. The limb holding assembly according to claim 17 further comprising a first base drive configured to set in motion the first base of the middle limb segment with the first cradle, and wherein the first base has movement limiters to stop movement of the first base.

19. The limb holding assembly according to claim 17, wherein the system and/or sensors are fixed on the first base, the second base, the first cradle, or the second cradle.

20. The limb holding assembly according to claim 17, wherein the system and/or sensors are placed remotely.

21. The limb holding assembly according to claim 17, wherein the first cradle and the second cradle are removable from the first base and the second base, respectively.

22. The limb holding assembly according to claim 17, wherein at least one of the cradles is made adjustable.

23. The limb holding assembly according to claim 17, wherein the second cradle is made in the form of an exoskeleton.

* * * * *